US009726482B2

(12) United States Patent
Iseli et al.

(10) Patent No.: US 9,726,482 B2
(45) Date of Patent: Aug. 8, 2017

(54) METHOD OF ACTIVELY COUNTERACTING DISPLACEMENT FORCES WITH A PROBING UNIT

(71) Applicant: HEXAGON TECHNOLOGY CENTER GMBH, Heerbrugg (CH)

(72) Inventors: Claudio Iseli, Au (CH); Bernhard Sprenger, Widnau (CH)

(73) Assignee: HEXAGON TECHNOLOGY CENTER GMBH, Heerbrugg (CH)

( * ) Notice: Subject to any disclaimer, the term of this patent is extended or adjusted under 35 U.S.C. 154(b) by 107 days.

(21) Appl. No.: 14/962,880

(22) Filed: Dec. 8, 2015

(65) Prior Publication Data
US 2016/0178362 A1 Jun. 23, 2016

(30) Foreign Application Priority Data

Dec. 19, 2014 (EP) ..................................... 14199469

(51) Int. Cl.
*G01B 21/00* (2006.01)
*G01B 21/04* (2006.01)
(Continued)

(52) U.S. Cl.
CPC ........... *G01B 21/045* (2013.01); *G01B 3/008* (2013.01); *G01B 5/008* (2013.01); *G01B 7/008* (2013.01);
(Continued)

(58) Field of Classification Search
CPC .... G01B 11/002; G01B 5/008; G01B 11/005; G01B 21/045
(Continued)

(56) References Cited

U.S. PATENT DOCUMENTS

| 5,623,766 A | 4/1997 | Ruck et al. |
| 6,591,208 B2 * | 7/2003 | Lotze ................... G01B 21/045 702/152 |

(Continued)

FOREIGN PATENT DOCUMENTS

| EP | 1 559 990 A3 | 12/2007 |
| EP | 1 687 589 B1 | 9/2012 |

(Continued)

OTHER PUBLICATIONS

European Search Report dated May 21, 2015 as received in Application No. 14199469.9.

*Primary Examiner* — Yaritza Guadalupe-McCall
(74) *Attorney, Agent, or Firm* — Maschoff Brennan

(57) ABSTRACT

Embodiments of the invention include a method for compensating a force at a probe element of a probing unit. The probing unit being attached to and moved along a defined moving path with a number of moving points by a coordinate measuring machine for approaching a measuring point at an object. The probing unit comprises an actuator which is arranged and designed in such manner that a force is applicable to the probe element with respect to at least one actuating direction in variable and defined manner, the force depending on an applied actuating signal. Movement information about an expected movement of the probing unit is received, the movement information provides information about an expected displacement behaviour of the probe element relative to the probing unit due to induced forces emerging by moving the probing unit.

20 Claims, 2 Drawing Sheets

(51) Int. Cl.
*G01B 5/008* (2006.01)
*G01B 7/008* (2006.01)
*G01B 11/00* (2006.01)
*G01B 3/00* (2006.01)

(52) U.S. Cl.
CPC .......... *G01B 11/005* (2013.01); *G01B 21/047* (2013.01)

(58) Field of Classification Search
USPC .......................................................... 33/503
See application file for complete search history.

(56) References Cited

U.S. PATENT DOCUMENTS

| | | | |
|---|---|---|---|
| 9,086,262 B2* | 7/2015 | Pettersson | G01B 21/045 |
| 2002/0029119 A1* | 3/2002 | Lotze | G01B 21/045 |
| | | | 702/95 |
| 2014/0007441 A1* | 1/2014 | Pettersson | G01B 21/045 |
| | | | 33/503 |
| 2014/0222372 A1* | 8/2014 | Sprenger | G01B 5/008 |
| | | | 702/155 |
| 2014/0222373 A1* | 8/2014 | Sprenger | G01B 21/045 |
| | | | 702/155 |
| 2014/0249772 A1* | 9/2014 | Sprenger | G01B 5/008 |
| | | | 702/152 |
| 2016/0178362 A1* | 6/2016 | Iseli | G01B 5/008 |
| | | | 33/503 |

FOREIGN PATENT DOCUMENTS

| | | |
|---|---|---|
| GB | 2 425 840 A | 11/2006 |
| WO | 02/04883 A1 | 1/2002 |

* cited by examiner

METHOD OF ACTIVELY COUNTERACTING DISPLACEMENT FORCES WITH A PROBING UNIT

FIELD

The present invention generally pertains to a method for compensating or avoiding effects to a probe element of a coordinate measuring machine (CMM) which are expected to occur by moving the probe element as to a given measuring path.

BACKGROUND

It is common practice to inspect work pieces subsequent to production on a coordinate positioning apparatus, such as a coordinate measuring machine (CMM), in order to check for correctness of predefined object parameters, like dimensions and shape of the object.

In a conventional 3-D coordinate measurement machine, a probe head is supported for movement along three mutually perpendicular axes (in directions X, Y and Z). Thereby, the probe head can be guided to any arbitrary point in space of a measuring volume of the coordinate measuring machine and the object is measurable with a measurement sensor (probing unit) carried by the probe head.

In a simple form of the machine a suitable transducer mounted parallel to each axis is able to determine the position of the probe head relative to a base of the machine and, therefore, to determine the coordinates of a measurement point on the object being approached by the sensor, e.g. by the probe tip of the probing unit. For providing movability of the probe head a typical coordinate measuring machine may comprise a frame structure on which the probe head is arranged and driving means for moving frame components of the frame structure relative to each other.

For measuring surface variations, both measurement principles based on use of tactile sensors and of optical sensors are known.

In general, to provide a coordinate measuring machine with an improved measurement precision, its frame structure is therefore usually designed to have a high static stiffness. In order to achieve a stiff and rigid machine design, the frame structure or at least parts of it, is often made of stone, such as granite. Besides all the positive effects like thermal stability and good damping properties, the granite also makes the machine and the movable frame elements quite heavy. The high weight on the other side also requires high forces for a decent acceleration.

There are still several possible sources of error, if such technique is employed. Excited resonances or vibrations of machine parts when moving one frame component relative to another component are just two examples for dynamic errors. Moreover, errors emerging from vibrations coming from outside the machine are to be considered. Additionally, static errors like lack of straightness in movement and of orthogonality of the axes or lateral offset in the linear drive mechanisms may occur.

According to many approaches the mentioned errors are only analyzed statically, although they also comprise dynamic factors which are dependent on the movement of the axes, in particular dependent on the position, speed, acceleration and jerk when moving the axis. With the speed-dependent calibration, this fact is taken into account in a rather simple and inflexible way. While the static errors can be numerically reduced by the use of position calibration matrices, things get much more complex when trying to compensate the dynamic errors.

The calibration gets even more complex when taking into account the dynamic errors, such as mentioned vibrations or resonance or dynamic forces etc. which errors can not only influence the axis on which they are occurring, but which can also "crosstalk" to other axes and cause errors in other parts of the system. Furthermore, the underlying effects can also be dependent on environmental conditions such as temperature, humidity, air-pressure, etc. and in particular, they will also vary over the lifetime of the machine.

In that context, for example, it has to be considered that accelerations of one axis of the machine (which can move further perpendicular axes and the probe head), can cause linear and angular dynamic deflections of the whole frame of the coordinate measuring machine (e.g. of the probe head), which in turn cause measurement uncertainties and errors. These dynamic measurement errors may be reduced by taking measurements at low accelerations, e.g. by a consequently optimized trajectory of desired movement.

Exemplarily for error handling, EP 1 559 990 discloses a coordinate measuring system and method of correcting coordinates measured in a coordinate measuring machine, measuring geometrical errors while parts with various weights are mounted on the coordinate measuring machine. Compensation parameters are derived from measured results per a weight of a part and stored. A compensation parameter corresponding to a weight of a part to be measured is appropriately read out to correct measured coordinates of the part to be measured.

As a further example, EP 1 687 589 discloses a method of error compensation in a coordinate measuring machine with an articulating probe head having a surface detecting device. The surface detecting device is rotated about at least one axis of the articulating probe head during measurement. The method comprises the steps of: determining the stiffness of the whole or part of the apparatus, determining one or more factors which relate to the load applied by the articulating probe head at any particular instant and determining the measurement error at the surface sensing device caused by the load.

Another approach for error correction of work piece measurements with a coordinate measuring machine (CMM) is disclosed in GB 2 425 840. Thereby, position measurements are taken with a work piece sensing probe, in which means of measuring acceleration are provided. The measurements are corrected for both high frequency (unrepeatable) errors such as those due to vibration, and low frequency (repeatable) errors such as those due to centrifugal forces on the probe. The correction method comprises measuring the work piece, determining repeatable measurement errors from a predetermined error function, error map or error look-up table, measuring acceleration and calculating unrepeatable measurement errors, combining the first and second measurement errors to determine total errors and correcting the work piece measurements using the total errors. The predetermined error map is calculated using an artefact of known dimensions.

It is also known to use accelerometers fitted in the probe or on other moving parts of the measurement machine, e.g. the Z-column and/or in the base table, allowing a differential measurement and/or the evaluation of externally applied vibrations. In such an arrangement, the displacements and errors of the probe-position can be measured with double integration and, based on this information, it is possible to adjust the reading with the difference between the doubly integrated signal and the scales. For instance, such a quasi-static approach is disclosed by WO 02/04883.

However, according to above approaches, a displacement of the probe element when moving (accelerating) the probing unit is considered by computational way only.

Especially when using a scanning probe with the CMM and applying quite high moving speeds for measuring an object the dynamic effects which influence the probe element increase and introduce more errors to be considered (e.g. due to emerging touching forces when touching of the surfaces continuously). This leads to more complex computation resulting in errors not being fully compensatable by computation.

In general, the measuring tip of a scanning probe can be deflected in all three Cartesian directions (x,y,z), wherein sensors at the probing unit measure the deflections for each direction. In general, the deflections are allowed and measured by a "three flexure system" (one for each direction) sequentially connected to each other.

A main requirement for existing probes is to minimize the impact on the measuring part (object to be measured) and the machine—which means reducing the contact force. At the same time cross coupling between the axes has to be minimized and the linearity has to be maintained.

Low impact force, minimized cross coupling and linearity yields into weak (low resonances) and/or large probe structures.

Scanning performance (speed, acceleration) is therefore limited by the probing unit (or probe head) itself—as the resonances get excited, the linearity zone is left, dynamic forces due to accelerations lead to probe sensing element deflections and (more important) lift-off might happen.

In order to reduce such effects existing scanning probes damp contact issues with the help of viscous fluids. It is well known that the properties of those fluids depend on the environmental conditions and might change during lifetime and production. Thus, damping forces may vary over time and are not well known.

Furthermore those fluids can only exert passive forces correlated to the speed of deflection. Damping effects are therefore limited and designed for specific resonance frequencies which may occur with a respective measuring system. Lift-off effects at certain speeds and surfaces to be touched might still happen and cannot be prevented due to the passive characteristics of the existing probes (using viscous fluids).

SUMMARY

Some embodiments of the present invention provide an improved method and system (CMM) for compensating, in particular avoiding, displacement errors of a probe element when moving the probe.

Some embodiments of the present invention provide more precise and reliable measuring values for respective measuring point at an object to be measured.

Some embodiments of the present invention maintain low touching forces with a probe element but overcome the above mentioned limitations by actively apply an adjustable counterforce to the probe element, e.g. a trajectory related damping force and/or an acceleration dependent counterforce compensating inertia effects and/or a velocity dependent counterforce compensating Coriolis effects and/or a position/orientation dependent counterforce compensating gravitation effects.

That approach focuses not on providing a constant contact force or a predefined force as known from prior art, but addresses to apply exact and known (and varying) forces to the probe element in order to provide an improved positional stability of the probe element depending on influences which emerge by moving the probing unit.

The invention relates to a method for at least partially compensating, in particular avoiding, a displacement of a probe element of a probing unit (relative to the probing unit itself or the probe head, respectively), i.e. compensating an induced force. A displacement of the probe element in sense of the present invention is preferably to be understood as a dislocation of a probe tip (of the probe element) or a bending of the stylus, wherein the stylus and/or the probe tip represent the probe element. Moreover, an oscillation of the probe element, e.g. the stylus and/or the probe tip, also is to be understood as a respective displacement. Particularly, any kind of deformation of the probe element represents a displacement of such element. The probing unit is attached to a coordinate measuring machine and is moved along a defined moving path with a number of moving points by the coordinate measuring machine, in particular to or by a probe head, for approaching a measuring point at an object.

The probing unit comprises at least one actuator which is arranged and designed in such manner that a (counter-) force is applicable to the probe element with respect to at least one actuating direction in variable and defined manner. The (counter-) force depends on an actuating signal applied to the actuator, which enables the actuator to exert variable forces to the probe element.

The method comprises receiving movement information about an expected, measured or planned movement of the probing unit, wherein the movement information provides information about a force affecting the probe element due to the movement of the probing unit.

Such a force affecting the probe element is for instance induced by an inertial force (like acceleration, centrifugal and/or Coriolis force) or by a field force (e.g. gravitational force, a force due to an electrostatic or magnetic field or the like).

At least one force parameter is derived for at least one particular moving point based on the movement information. For instance, a force effect on the probe element for the at least one particular moving point may be calculated based on the movement information, e.g. a magnitude and/or direction of the force. Furthermore, a corresponding actuating signal for the at least one particular moving point is determined based on the at least one force parameter, that actuating signal provides applying a defined counterforce by the actuator regarding the force affecting the probe element at the particular moving point.

In particular, the actuating signal is correlated to a target current at the actuator in order to apply a defined target counterforce.

The actuating signal can be provided to the actuator—in case of the movement information providing information about the expected movement of the probing unit—(immediately) before the probing unit reaches the particular moving point. Such can be applied based on information given by a known moving trajectory.

By doing so, an adjusted counterforce is applicable to the probe element which counteracts the induced force at the probe element (an expected displacement which would be caused by the induced force) in corresponding manner and thus provides for the probe element remaining at a desired reference position or inside of a defined reference zone around that position.

Relating to applying the actuating signal after the probing unit reaches the moving point, such approach is preferably applied based on a measurement of the movement of the probing unit (which represents the movement information), wherein the measuring information is used for determining the actuating signal. Respective measurement may be performed using an accelerometer giving information about possible oscillations e.g. at the probing unit. Thus, a corresponding damping of the oscillations can be provided.

The actuator (e.g. a voice-coil) can be used to damp the dynamic behaviour of the probe (element) by utilizing the actuator as a generator to passively or actively influence kinetic energies in the system.

According to the passive approach, kinetic energy assigned to the probing element can be extinguished by a resistor connected to the actuator, wherein induced current of the actuator is discharged via the resistor. "Passive" here relates to a respective setting of the resistance. In that way, a suitable damping of oscillations can be realised. The counterforce here is to be understood as a corresponding passive damping.

According to the active approach, the kinetic energy is counteracted by a respective actively induced counterforce. This may be done by a controller applying respective current to the actuator, wherein the actively induced counterforce directly depends on the applied current. Alternatively or additionally, the resistance of a provided resistor is adapted accordingly.

Here, a predictive counterforce can be induces based on information about an expected force at the probe element or a reactive counterforce can be induced based on a measurement of e.g. velocity (e.g. by measuring a voltage over the actuator).

The exerted counterforce applied by the actuator can be calculated from measurements of a current applied to the actuator to increase accuracy.

With other words, a current at the actuator can be measured and, based thereon, a precise measure for an actual counterforce can be derived, wherein the current depends on the actuating signal and/or the actuating signal is actualised based on the measured current. The current at the actuator may correspond to the current applied due to the actuating signal or may correspond to a current generated by an induced actuation of the actuator due to an external impact (inertial or field force), generally speaking the current at the actuator is represented by a current being directly measurable at the actuator. By doing so, a direct and precise determination of a force induced to the system is provided, wherein such precise information may enable for more accurate modelling of the dynamics in the probing unit. Moreover, based on a comparison of the actuating signal and an effectively occurring counterforce an adaptation of the actuating signal can be provided in order to exactly reach a demanded counterforce.

Thus, by determining a current at the actuator and exactly knowing about the so induced force and additionally knowing about the spring properties of the probe element (stylus) a total force at the probe element can be derived.

These ideas relate to scanning probes as well as to any other kind of touch probe, e.g. touch trigger probe, having a probe element for contacting the object to be measured.

The resulting force of the probe element acting on the machine preferably is a combination of touching forces (forces between the object and the probe element), inertial forces (including acceleration, centrifugal and/or Coriolis forces), field forces (e.g. gravitational forces, forces due to an electrostatic or magnetic field), actuating (displacement) forces and/or damping forces. Touching and inertia effects can be modelled or calculated comparatively easily whereas damping forces which are applied to the probe element are—according to prior art—in general not known at a required accuracy level.

Within that new approach the knowledge of the exact counteracting force (damping and/or actuating force) as applied provides for higher accuracy as the deflection of the rest of the machine (i.e. except of the probing unit and its probe element) due to the touching forces and probe inertia can be taken into account by other means and (dynamic) models. In addition, more exact determination of the counteracting force can be provided by measuring a currently applied current at the actuator.

For driving a coordinate measuring machine at higher speeds and dynamics and for maintaining low touching forces, the present idea provides keeping the touching forces low and/or the probe deflection from the ideal position low, but be able to drive at high speeds.

The usage of small or compact voice-coils which embody the actuator allows the application of specific and task dependent counterforces (damping effects) where the forces are always well known by measurements and/or calculations, and could be modelled as well.

Furthermore, variable damping of vibrations or oscillations allows to keep deflections in certain limits in a more efficient way to avoid cross coupling between the machine axes.

A main advantage of the present invention is avoiding or reducing any additional damping fluid within the probing unit or the probe head—which would negatively influence the knowledge about applied forces and the precise extraction of the exact probing force.

Therefore, by using the present invention, a small, compact and lightweight probing unit can be provided, wherein the probing unit comprises "weak" flexures (for providing small touching forces) and where dynamic forces at the probe element can be compensated and/or damped by a small actuator, e.g. by a voice-coil. By such replacement of known damping fluids and such compensation of inertia (including acceleration, centrifugal and/or gravitation) forces low stiffness of the probe element can be maintained and therefore a low impact on a part to be measured is realised while enabling high dynamic movements.

As a consequence, the exact force impact on the probe head and on the machine can be determined and be compensated accordingly. The contact force has not to be maintained constant (compared to prior art approaches).

With other words, in general relating to the invention, the inventive use of a controllable element allowing to inject and/or extract energy (actuator, e.g. voice-coil) provides producing actively variable counterforces and/or passively variable damping forces between the probe element and the probe head. Such an element is used to produce forces counteracting inertia forces, like acceleration, centrifugal, Coriolis and/or gravitation forces, acting between the probe element and probe head, and to provide task specific damping between the probe element and probe head. The particular damping and counteracting properties can adaptively and electronically be modified during probing or scanning processes. The properties can be set or adapted according to the actual state of the measurement process (e.g. concerning speed, acceleration, stylus length, stylus orientation, gravity effects etc.). Thus, damping forces become predictable.

For calculation of a total force impact on the CMM, contact forces, inertia, actuating and damping forces are considered and can be calculated at high frequencies. As a consequence, force impact on the machine is clear from low to high frequencies.

According to an embodiment of the invention, the movement information provides information about an expected inertial force, in particular acceleration, centrifugal, Coriolis, and/or an field force, in particular gravitation force, induced at the probe element by moving the probing unit (e.g. induced by accelerations of the probing unit), wherein the expected inertial force affects a particular displacement force of the probe element relative to the probing unit, in particular at the probe tip. Furthermore, the actuating signal is determined so that the resulting counterforce which is applicable by the actuator correspondingly counteracts the inertial force, and the actuating signal is provided to the actuator (e.g. as an offset signal) so that the particular displacement force at the probe element is compensated.

Above approach provides a reduction or avoidance of (future) expected displacements of the probe element which would occur without any counteracting. By application of the specifically determined controlling signal, i.e. corresponding to an expected inertial effect which would lead to a displacement of the probe tip, such unwanted displacement is counteracted and avoided or reduced. The main variable on basis of which the possible displacement is calculated is a moving parameter describing a future or current movement of the probing unit, in particular in a CMMs' coordinate system.

According to a further embodiment of the invention, the movement information provides information about dynamical effects, in particular oscillations, induced at the probe element by moving the probing unit. The actuating signal is determined and provided to the actuator based on the movement information or the force parameter (of the probe element) so that the dynamical effects are cancelled out or damped, in particular by considering a structural design of the coordinate measuring machine and/or the probing unit, in particular using a dynamical model.

By doing so, damping is applied to the probe element by the actuator, wherein the damping effect corresponds to the determined vibration effect in opposed manner. In that context, the controlling signal may be embodied as a variable resistance of a driving circuit of the actuator. Thus, the originally (i.e. without applying any damping) occurring vibration are reduced and damped which provides a more (positional) stable probe element and prevents from cross coupling of such vibration effects to other structural components of the CMM.

In particular, the actuating signal may continuously be adapted based on the movement information with a defined sampling frequency such that an amplitude with reference to the dynamical effects (e.g. amplitude of the oscillation of the probe tip) is reduced so that the reduced amplitude remains below a pre-determined threshold, wherein an oscillation frequency as to the dynamical effect corresponds to the controlling frequency or to a multiple of the sampling frequency.

The counteracting actuating force of the actuator can be adjusted to the expected or measured oscillation at the probe element so that a real opposing effect is induced by opposite force directions at particular moments of the oscillation.

A counteracting oscillation applied by the actuator may comprise a frequency which corresponds to the oscillation frequency of the probe element or to a multiple or a fraction of the oscillation frequency of the probe element. Particularly, the oscillation is applied with a defined phase shift regarding the oscillation of the probe element.

The approach of counteracting oscillations of the probe element preferably relates to currently induced forces (compared to expected induced forces) and the compensation of such current influences.

In context of the present invention, the actuating signal can be continuously actualised depending on the movement information for particular moving points, in particular for successive moving points, so that respective counterforces are applied to the probe element as to the induced force or the expected displacements for the particular moving points. This provides for a continuous and moving-path adapted application of specified counterforces during an entire measuring process.

Thus, a real active damping of vibrations and/or an active compensation of inertial (e.g. acceleration, Coriolis and/or gravitation) effects is provided and enables a more accurate measurement of desired measuring points and/or modelling of static and dynamic effects of the whole CMM.

According to an embodiment of the invention, the force parameter is derived by computing at least one particular expected displacement of the probe element or the induced force at the probe element (e.g. a field force or inertial force) for the at least one particular moving point based on the movement information. Alternatively or additionally, the force parameter is derived by determining at least one particular expected displacement or measured displacement (velocity) of the probe element or the induced force at the probe element using a look-up table, the look-up table providing a correlation between an expected and/or measured movement of the probing unit and the induced force.

In context of the invention, the movement information may provide information about an expected movement of the probing unit. Such expected movement can be derived based on a dynamic model which describes a behaviour (e.g. oscillations) of the measuring device, the probing unit and/or the probe element while moving. For instance, natural frequencies and their excitations can be modelled and calculated. Of course, model-based calculations also may provide information about a current (compared to an expected) moving state. In addition to or as an alternative to the model-based calculation concerning the movement information, a measurement of a machine property may be provided, wherein the measurement gives information about current moving parameters like a moving speed, direction and/or acceleration, in particular about changes of respective parameters. An acceleration and/or gyro sensor may be provided for providing such measurement. Furthermore, the movement information may contain information referring to a planned movement of the probing unit, i.e. a planned moving path, wherein that information may be determined based on a known part program. Therefore, information about current and expected moving parameters and induced forces may be provided by a planned trajectory.

Now referring to the occurrence of displacements and to the application of counterforces as to particular directions and direction-related components, it generally is to be understood in context of the present invention that based on the movement information a number of displacement effects and related impact directions can be calculated and that a particular counteraction is determined to be applied as to at least one particular impact magnitude and direction. Such one or more impact direction, according to which the compensation can be applied, depends on the design and arrangement of the actuator and its actuating direction.

With other words, the occurring displacement may comprise a first effective direction which corresponds to the X-axis of the CMM and a second effective direction which corresponds to the Y-axis of the CMM. The actuator may be arranged so that an actuating force can be applied in X-direction. The actuating signal is determined so that on its application to the actuator a counterforce in X-direction (parallel to the X-axis) is applied which in particular corresponds as to its magnitude and temporal behaviour to the corresponding displacement component in the first effective direction (X-axis).

Thus, according to the invention, a first component of the induced force affecting the probe element referring to a first direction is compensated due to application of a defined counterforce in actuating direction by setting the actuating signal, the first direction being at least basically parallel to the actuating direction.

According to a specific embodiment of the invention acceleration and/or velocity values referring to the moved probe element are derived, in particular magnitude and direction of an occurring acceleration, and the actuating signal is set based on the acceleration and/or velocity values. Such acceleration or velocity information gives further information about the inertia, Coriolis and/or gravitation force effects to be expected upon particular moving parameters.

As already mentioned above the compensation of impacts upon moving of the probing unit is provided so that the probe element stays within a defined probe zone. With other words, the actuating signal is set based on the movement information such that the displacement of the probe element which is induced by moving the probing unit (and inertia effects induced thereby) is compensated as to a defined set-point, in particular tool centre point, wherein a probe tip remains within a defined tolerance zone around the set-point.

Information about movement of the probing unit and of the probe element in particular can be given by or is based on
- a part program which provides a measuring path the probing unit is to be moved along and/or
- a given moving trajectory and/or
- an encoding unit (in particular represented by an accelerometer and/or a probe deflection measuring device and/or scale detecting unit) at the coordinate measuring machine which provides moving information of a machine component, in particular position, velocity and/or accelerations, and/or
- a model which represents a structural design and a mechanical behaviour of the coordinate measuring machine and/or the probing unit.

In particular, by use of such model, oscillations or vibrations in the system, which are exited upon moving a part of the CMM and which are transferred or induced to or at the probing unit and its probe element, can be considered and compensated by applying a defined actuating force.

According to a further aspect, the movement information provides information for the respective moving points (i.e. for a number of points along the moving path) of the expected movement about
- position,
- a movement velocity,
- occurring accelerations,
- inertial forces,
- vibrational effects and/or
- expected touching forces.

The invention also relates to a probing system for a coordinate measuring machine. The system comprises a probing unit with a probe element and an actuator which is arranged and designed in such manner that a counterforce is applicable to the probe element with respect to at least one actuating direction in variable manner, the counterforce depending on an applied actuating signal. The system further comprises a controlling and processing unit for controlling movement of the probing unit along a defined moving path with a number of moving points and for providing the actuating signal for controlling the actuator.

According to the invention, the controlling and processing unit is adapted to receive movement information concerning an expected, measured and/or planned movement of the probing unit, the movement information provides information about an induced force affecting the probe element due to movement of the probing unit. A force parameter for at least one particular moving point is derived based on the movement information (by means of the controlling and processing unit). In particular, at least one particular force parameter (for compensating the expected displacement) of the probe element for the at least one particular moving point is computable by the controlling and processing unit based on the movement information.

Moreover, the controlling and processing unit is adapted to determine the actuating signal for the at least one particular moving point based on the force parameter, the actuating signal provides applying a defined counterforce regarding the induced force to the probe element by the actuator at the particular moving point.

In particular, the actuating signal is provided to the actuator, in particular (immediately) before the probing unit reaches the particular moving point on moving along the moving path, in particular for counteracting an expected displacement in advance. In particular, the controlling and processing unit is adapted to execution of any method as outlined above.

According to an embodiment of the invention the actuator is embodied as an electro-magnetic actuator, in particular as a voice-coil. Such electro-magnetic actuator provides precise and high dynamic adjustability of applied forces. Furthermore, the applied force is precisely known and/or can precisely be determined (by measurement of current) to the whole system which provides for more precise modelling of the system.

Voice-coils and other electromagnetic actuators can be utilized in motor mode to inject (and actively extract) movement energy into the system and thus, together with a driving unit, apply varying forces. This allows to exert counterforces to compensate for induced forces due to movement and/or oscillations.

On the other hand, voice-coils can be utilized in generator mode to extract movement energy from the system and thus, together with a resistive element, act as a passive damping element. By using a variable resistive element, such as a potentiometer or electronically control resistor (e.g. transistor, in particular a MosFet), the voice-coil acts as a variable passive damping element, which allows to change the damping properties dependent on the task and/or movement information.

Those two operation mode of voice-coils and other electromagnetic actuators can be combined, either by integrating more windings into its design, or by electrically combining both operating modes. This can be achieved by combining an electronically controlled resistor and an electronically controlled current source.

Alternatively, the actuator is represented by a pneumatic or hydraulic actuator.

A further embodiment of the present invention relates to controlling of the actuator. The probing system comprises an impedance element connected to the actuator, wherein the impedance element provides adjusting an offset signal, in particular an offset counterforce (the offset counterforce preferably being defined by the offset signal), applicable by the actuator and/or adjusting a damping of dynamic effects occurring at the probe element. Generally speaking, the impedance element enables to control the actuator for application of well defined forces as to particular moments in time.

In that context, an offset (the actuating signal) is settable by adjusting a current of the impedance element and/or the damping of the dynamic effects is settable by adjusting a resistance of the impedance element, wherein the controlling signal is represented by the current and/or the resistance. With other words, the controlling signal can be a current and/or a resistance which can be varied.

The invention also relates to a coordinate measuring machine comprising a probing system according to any embodiment as mentioned above, a base, a machine structure with structural components linking the probing unit to the base and at least one drive mechanism for providing movability of the probing unit relative to the base.

As known from prior art the machine structure can be embodied according to a bridge-like or parallel kinematical structure or according to any other kind of typical CMM.

Furthermore, the invention relates to a computer program product having computer-executable instructions for performing and respectively controlling the method as mentioned above, in particular when run on a controlling and processing unit of a probing system of above.

In the following some particular advantages of the present invention are described in context either with the most general approach as described above or with more specific embodiments.

By use of the invention, the scanning performance can be significantly increased, as acceleration forces leading to sensing element deflections (probe element vs. probing unit) are actively compensated and thus, the deflection can be kept in an optimal range even in case of large inertia forces (e.g. by applying an acceleration dependent bias current through the voice-coil).

Moreover, the scanning performance can be significantly increased as one or more voice-coils of the probing unit can be used as passively adaptive damping elements (e.g. short-circuit across voice-coil, electronically controlled resistor (e.g. MosFet)).

In addition, the scanning performance can be significantly increased as lift offs (losing touch to the object to be scanned while performing a scanning procedure) are minimized or avoided and as excited probe resonances can efficiently be damped or inertia, Coriolis and/or gravitation effects compensated. Due to the relaxed requirements to not necessarily keep the contact force constant—smaller actuators and less power consumption are required.

As already mentioned, as acceleration and therefore inertia can be calculated and reaction forces of the voice-coil are precisely known, the total force acting on the part to be measured is exactly known. This also contributes to more accurate (dynamical) modelling of the whole CMM.

Furthermore, the total force acting on the probing unit is used to calculate the machine deflections due to that touching forces (other prior art strategies to damp oscillations and increase stiffness don't allow to extract the touching forces in that simple and precise way).

As a further advantage, the damping properties of the probing unit are dynamically changeable and electronically controllable. Probe damping can be adjusted depending on a particular measuring task.

Moreover, there is less heat generated at the probe compared to applications where force needs to be constant.

The movement induced probe deflection according to predicted inertia, centrifugal and/or gravitation forces can dynamically be compensated by controlling the bias current through the voice-coil. A real measure of the occurring probe deflection is not required as an input of a control system. Thus, there is no control loop required for probe deflections.

As an important aspect of the invention, the bias current of the voice-coil can be influenced based on the differences occurring from inertial forces (e.g. acceleration, Coriolis and/or gravitation) between the probe element and the probing unit or the probe head to optimize the probe force. A dynamic compensation of probe deflection according to predicted inertia forces is enabled by controlling the bias current through the voice-coil (without using a probe deflection as an input of a control system).

The present approach allows to efficiently damp vibrations without an additional controller or integration into an existing controller. Dynamically changeable electronically controlled damping properties of the probe are a result thereof. The approach according to the invention (using above elements and strategies) provides keeping the probe deflection within certain limits to avoid or minimize cross coupling between machine axes. The approach is not adapted to keep the force constant.

Moreover, the inventive approach is to be understood as not being designed as a closed control circuit like a closed-loop circuit, but is designed as a controlling approach without direct system feedback (open-loop) and "only" using particular inputs for setting the actuating signal.

Furthermore, the probe deflection mechanism can be integrated into an existing positioning/scanning loop of the CMM for contributing to a more precise global control of the CMM.

The impact on the machine due to touching, inertia, gravitation and/or damping effects of the probe element can be compensated with the help of a specific model based compensation.

According to a further embodiment, the active elements (actuators) could be thermally separated from the precise mechanics to minimize heating up effects and their influence in general. Alternatively—depending on given requirements—the actuators could be thermally connected as good as possible to spread heat waste effects efficiently into the whole structure.

As a further embodiment of the invention, the active element, i.e. the actuator, can be placed far away from the metrological structure to minimize their thermal influence. Passive transducers can connect the active elements with the precise metro-logical structure.

BRIEF DESCRIPTION OF THE FIGURES

The method and the device according to the invention are described or explained in more detail below, purely by way of example, with reference to working examples shown schematically in the drawings. Specifically.

DETAILED DESCRIPTION

Figure 1:
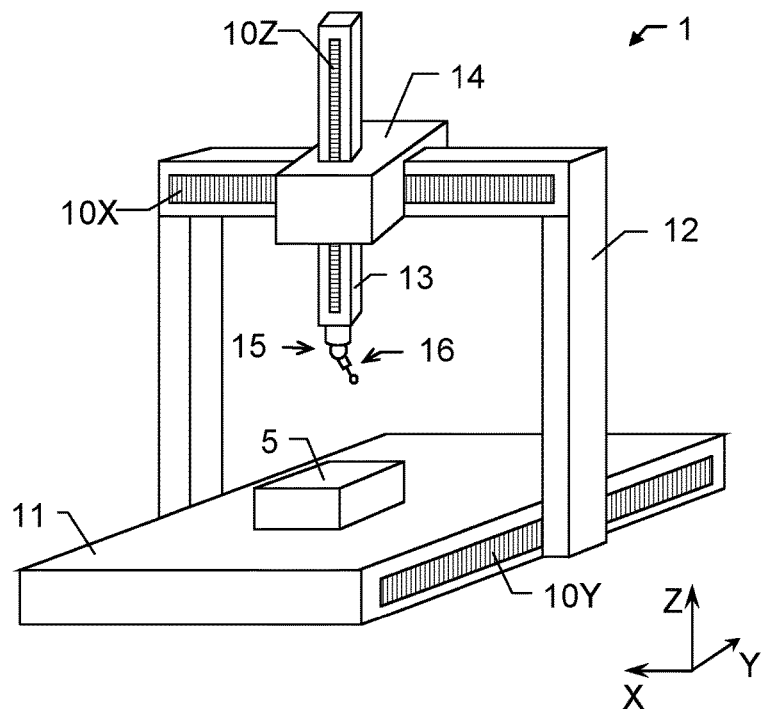
FIG. 1 shows an embodiment of a portal coordinate measuring machine according to the invention.

In FIG. 1 an embodiment of a portal coordinate measuring machine 1 (CMM) according to the invention is depicted, the coordinate measuring machine 1 comprises a base 11 and a frame structure for linking a probe head 15 and a probing unit 16, which is connected to the probe head 15, to the base 11, the frame structure comprising several frame components 12,13,14 being movable with respect to another. The first frame component 12 is a portal having two portal legs, which are connected by a bridging portion at their upper ends. Driven by a drive mechanism (not shown), the frame component 12 is capable to move along the longitudinal sides of the base 11. This direction corresponds to a first direction Y. The movement of the frame component 12 particularly is performed by a gear rack attached to the base 11, which is meshing with a pinion on the frame component 12.

A carriage 14 is movably arranged on the bridging portion of the frame component 12. The movement of the carriage 14 (which is to bee seen as a further frame component) may also be achieved by a rack and pinion. A vertical rod 13 (sleeve, Z-ram), building a further frame component, is movably incorporated into the carriage 14. At the bottom portion of the vertical rod 13 a probe head 15 (which in context of the present invention is to be considered as a structural component of the CMM as well) with the probing unit 16 is provided.

The probe head 15 is movable to any desired point in a measuring volume (work zone) of the coordinate measuring machine 1 in the directions X, Y and Z. The measuring volume is defined by the base 11 and the frame components 12,13 and in particular by the range of movability of the carriage 14. The three space directions X, Y and Z are preferably orthogonal to one another, although this is not necessary for the present invention. It should be noted that a drive mechanism and a controller for driving the frame components and, thus, for driving the probe head 15 are not shown.

An object 5 to be measured is positioned in the space of the measuring volume on the base 11.

The probe head 15, on which the probing unit 16 with a probe element (stylus) is arranged, is fastened on the lower free end of the rod 13. The stylus is used in a manner known per se for touching the object 5 to be measured. However, the present invention is not restricted to a tactile coordinate measuring machine and may likewise be used for coordinate measuring machines in which a measurement point is approached in a non-contact manner, i.e. for example a coordinate measuring machine with an optical scanning head.

The probe head 15 is designed as an articulating probe head 15 for aligning the probing unit in any particular direction. Alternatively, the probe head 15 may be embodied in non-articulating manner for keeping the attached probing unit 16 in a defined orientation as to the probe head 15.

Two of the most common types of bearings between the movable members and the guides are air bearings or ball bearings (e.g. linear circulating plus rails). The air bearings give the advantage that there is no friction in the movement (which may introduce different kind of errors like angle errors or hysteresis). The disadvantage of air bearings is that the stiffness is lower than in ball bearings, so that particularly dynamic errors may occur. In ball bearing types, the stiffness in the bearing system is typically higher but there is friction and the friction forces may introduce errors.

Summed up, the coordinate measuring machine 1 is built for determination of three space coordinates of a measurement point on an object 5 to be measured and, therefore, comprises three linear drive mechanisms for provision of movability of the probing unit 16 relative to the base 11 in the first, second and third direction (X, Y and Z direction) and particularly machine components providing additional rotatory degrees of freedom (e.g. articulating probe head).

Each linear drive mechanism has a linear guide, one in the first, one in the second and one in the third direction (X, Y and Z direction), respectively. In a simple embodiment, the linear guide of the Y-direction drive mechanism is formed by two edge-building surfaces of the base 11, the linear guide of the X-direction drive mechanism is formed by two or three surfaces of the bridge and the linear guide of the Z-direction drive mechanism is formed by a cubical hole in the X-carriage member.

Furthermore, each linear drive mechanism comprises a movable member being supported for movement along the guide by bearings. In particular, the movable member of the Y-direction drive mechanism is embodied as Y-carriage having mutually facing surfaces with respect to the above mentioned two or three guiding surfaces of the base 11. The movable member of the X-direction drive mechanism is embodied as X-carriage 14 having mutually facing surfaces with respect to the above mentioned two or three guiding surfaces of the bridge. And, the movable member of the Z-direction drive mechanism is formed by Z-column 13 (sleeve) having mutually facing surfaces with respect to the inner surfaces of the cubical hole in the X-carriage.

Moreover, each linear drive mechanism comprises a linear measuring instrument for determination of a first, a second or a third drive position, respectively, of each movable member in the first, the second or the third direction (X, Y and Z direction), respectively.

In this embodiment of FIG. 1, the portal legs each have a movable Y-carriage which allows movement of the first frame component 12 in Y-direction.

A measuring scale 10Y being part of the Y-measuring instrument is schematically represented on the long side of the base 11, wherein the scale 10Y extends parallel to the Y-direction. The scale may be a glass measuring scale, e.g. having incremental or absolute coding, with which a drive position in the Y-direction of the Y-carriage can be determined. It is to be understood that the measuring instrument may furthermore contain suitable sensors for reading the measuring scale 10Y, although for the sake of simplicity these are not represented here. However, it should be pointed out that the invention is not restricted to the use of glass measuring scales, and therefore may also be used with other measuring instruments for recording the drive/travelling-positions of the movable members of the drive mechanisms.

Another measuring scale 10X is arranged parallel to the X-direction on the bridging portion of the first frame component 12. Finally, another measuring scale 10Z is also arranged parallel to the Z-direction on the Z-ram 14. By means of the measuring scales 10X,10Z as part of the linear measuring instruments, it is possible to record the present drive positions of the second frame member 14 in X-direction and of the sleeve 13 in the Z-direction metrologically in a manner which is known per se.

In the shown embodiment, the base 11 comprises a table with a granite surface plate for supporting the object 5 to be measured, on which the space coordinates of the measurement point are intended to be determined.

Not shown is a controlling and processing unit, which is designed to actuate the motor drives of the coordinate measuring machine 1 so that the probe head 15 travels to the measurement point. The controlling and processing unit comprises a processor and a memory. In particular, the controlling and processing unit is designed for determining the three space-coordinates of the measurement point on the object 5 as a function of at least the first, the second and the third drive position of the three drive mechanisms.

For manual operation, the control unit may be connected to a user console. It is also possible for the control unit to fully automatically approach and measure measurement points of the object 5 to be measured.

Because the design of coordinate measuring machines of the generic kind as well as the design of different linear guides and different linear measuring instruments are well known to skilled persons, it must be understood that numerous modifications and combinations of different features can be made. All of these modifications lie within the scope of the invention.

Thus, the invention may generally be used with all types of coordinate measuring machines, i.e. with a CMM being designed as parallel kinematics machine as well as with a CMM having linear or serial kinematics. Exemplarily, the CMM may be designed as bridge-type, L-bridge-type, horizontal-arm-type, cantilever-type or gantry-type machine or may be designed as articulated arm. Furthermore, the invention also relates to coordinate measuring machines with rotational axis, such as the Scara-type and delta kinematics (parallel kinematics) and machine with articulated heads.

Moreover, according to the invention, the probing unit 16 comprises an electromagnetic actuator (see FIG. 2) which provides a variable application of variably definable forces to the probe element (i.e. stylus and/or probe tip) of the probing unit 16. Such actuator may for example be built in form of a voice-coil.

The actuator is used to counteract occurring forces at the probe element by applying a counteracting force between the probing unit and the probe element. Such occurring forces are induced at the probe element when moving the probe head 16 or probing unit 16 in the measuring volume along any of the axes X, Y or Z or around a rotation axis defined by the articulating probe head 15 or any other machine axis. Thus, as the moving path for the probing unit 16 is known, occurring forces (and accelerations) can be measured or be predicted by calculation and/or modelling the behaviour of the probe element upon such movement. Length and mass of the probe element are known and typical input variables for such calculation and/or modelling.

A defined counteracting force can be applied to the system at any particular instance of moving the probing unit. Thus, the damping and/or actuating force of the probe element is known (e.g. calculation based on current measurements) which leads to a more precise modelling of the whole measuring system (including the CMM structure).

The counteracting force provides the probe element to be kept inside of a defined reference zone (e.g. with reference to the tool centre point, TCP) although external forces (generated by acceleration, Coriolis and gravitation effects of the probe element) affect the probe element. The counteracting forces generated by the actuator counteract the external forces.

By doing so, a continuous offset (actuating) signal for the probe element may be provided, wherein the offset signal is an active pilot signal (open loop control) approach using movement information of the measuring system (but no contribution (negligible) of the probe element deflection to the movement information). The critical variable to be influenced that way relates to the position of the probe element (probe tip) relative to a reference point and—compared to prior art—does not focus on a defined contact force to be applied when measuring the object 5. The offset (actuating) signal provides application of a defined offset (actuating) force to the probe element (comparable to an approach for pilot-control).

The actuator is connected to the controlling and processing unit of the CMM 1. The controlling and processing unit receives (or even produces or provides) the movement information which provides information about a (future) movement of the probing unit. Based on the movement information occurring actual forces or to be expected (inertial) forces (e.g. centrifugal and/or gravitational effects) which are applied to the probe element by moving the probing unit are derived.

Furthermore, in a next step, an actuating signal is generated so that on application of the signal with the actuator a particular counterforce is induced by the actuator and applied to the probe element. The actuating signal is transferred to the actuator in advance of or when reaching a or being positioned at a particular moving point for which the controlling signal is calculated, i.e. an expected or actual inertial force at the probe element is counteracted at the instance of time when the probing unit is at a particular moving point (=point along a measuring path).

The movement information provides information which kind and magnitude of displacement of the probe element occurs or will occur when moving the probing unit 16 as planned. Moreover, the movement information, in particular together with a model which describes the mechanical and/or dynamical behaviour of the CMM 1, provides information about oscillations (vibrations) which are induced in case of moving the CMM 1 as planned.

Thus, as a further aspect of the present invention, a damping signal may be provided by the controlling and processing unit as the actuating signal, the damping signal may be derived based on the movement information which gives information about occurring dynamical effects (e.g. vibrations/oscillations) at the CMM 1, i.e. as to at least one particular structural component of the CMM 1 or the probing unit 16.

By applying the damping signal to the actuator an anti-vibrational force (e.g. an anti-oscillation, i.e. an oscillation with a defined phase shift) is induced by the actuator which leads to a damping of the occurring dynamical effect at the probe element.

Thus, not only an offset control (compensating signal) for (future) inertial, Coriolis or gravitation forces is provided by the present invention, but also an active and/or passive damping of vibrations of the probe element can be achieved. These three approaches contribute to a more precise measurement with a respective CMM 1 as—on the one hand—the induced counterforce is known (which enables a more precise model of the moving CMM 1) and the probe element remains within limits of a predefined confidential zone (less computational compensation is required) and—on the other hand—the probe element is less influenced (displaced) by vibrational influences.

It is to be understood that either an offset control (compensating signal) for current or future inertial forces or an active or a passive damping of vibrations of the probe element may be performed or a combination of at least two such approaches.

The active or passive damping or offset control are controlled and induced based on information about a known movement of the probing unit 16. With other words, an expected force or displacement (induced by inertial forces, field forces and/or dynamical effects) at or of the probe element can be computed from the known movement path and such expected displacement is counteracted by means of the actively (actively applying a counterforce) and/or passively (extracting energy from the system e.g. by damping via a resistor) controllable actuator, i.e. by applying a defined counterforce and/or adjustable damping characteristics in advance or (at the latest) when the probing unit reaches a particular point on the movement path which the counterforce is computed for. Reaching a particular moving point is to be understood in sense of temporal or positional dimensions. Moreover, not only expected forces can be counteracted but also currently occurring forces (which may be measured or derived model-based) can be handled according to the approach of above, i.e. based on the knowledge of movement of the probing unit.

Figure 2A:
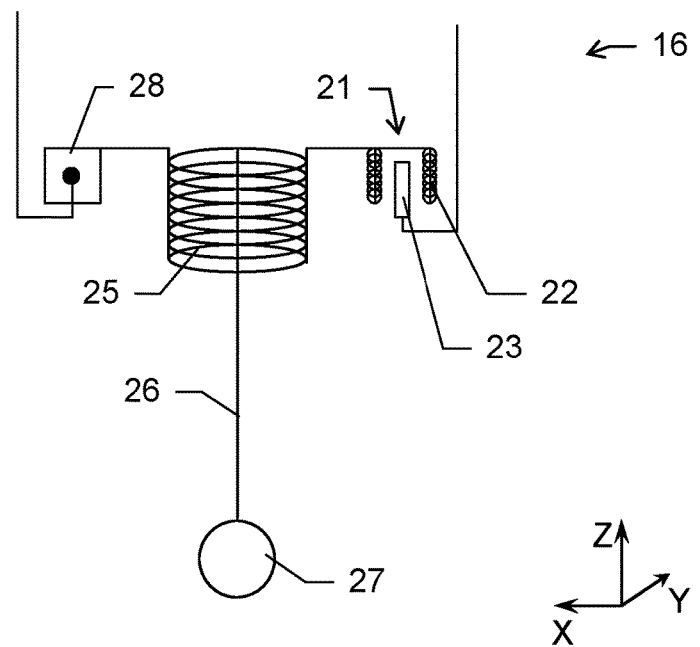
FIGS. 2a-b show a probing unit and an actuator of the probing unit according to the invention.

FIG. 2a shows a probing unit 16 according to the invention, which may be a part of a probing system according to the invention; the probing system comprises a controlling and processing unit in addition.

The probing unit 16 comprises a stylus 26 with a probe tip 27 at its lower end. Stylus 26 and/or probe tip 27 (in combination or on their own) represent a probe element of the probing unit 16 in sense of the present invention. The stylus 26 is coupled to a spring 25 for providing a defined moving range in z-direction for the stylus 26. Moreover, the probing unit 16 comprises a sensing unit 28 which enables to measure displacements of the probe element relative to the probing unit 16 in at least one direction.

Furthermore, the probing unit 16 comprises an actuator 21 which is coupled to the probe element and, thus, provides application of defined forces to the probe element.

As can be seen, the actuator 21 comprises two elements 22,23 one of which (23) is connected to a body of the probing unit and the other (22) is connected to the probe element. The actuator is designed to be electronically driven, i.e. for instance kind and magnitude of induces forces are adjustable by applying a defined current and providing a defined resistance.

According to a preferred embodiment (as depicted), the actuator is designed in form of a voice-coil having as a first component a coil element 22 (inductor) and as a second component a (e.g. permanent) magnetic element 23.

By applying a defined current to the coil element 22 a defined offset (pilot control) force is applicable to the probe element. This allows counteracting externally induced forces (e.g. emerging from accelerations) in a well defined manner and—by individually and continuously adjusting the current—in continuous manner for ongoing compensation of external forces.

Knowledge about the current to be applied for a suitable compensation is derived from movement information which describes an expected movement of the probing unit 16 when attached to a probe head of a CMM and moved by means of the CMM. A corresponding moving or displacement behaviour of the probe element can be computed therefrom. Inertial and/or field forces (acceleration forces, centrifugal forces, Coriolis forces, bending forces, gravity effects etc.) can be derived on basis of the movement information. Induced forces (like inertial or field forces) at the probe element also can be derived on basis of a measurement regarding the movement of the probing unit.

For damping of occurring vibrations at the probe element, a variable controllable resistor is connected to the actuator 21. By adjusting the resistance of the resistor particular vibrations or oscillations of the probe element can be damped (compensated). The information about emerging vibrations can be derived based on the movement information as well. In particular, a model of the measuring system (CMM and/or probing unit) is used for gathering information about occurring vibrations in addition.

One advantage of the present approach is the exact knowledge about the forces to be brought into the system by the actuator, which allows for more precise dynamical modelling of the whole measuring system.

Figure 2B:
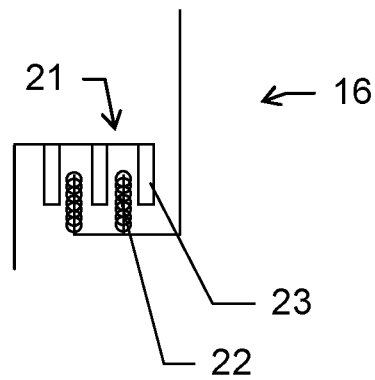

FIG. 2b shows an alternative embodiment of an actuator 21 provided by a probing unit 16 according to the invention. Here the electromagnetic actively controllable elements 22 are attached on side of the body of the probing unit 16, wherein the (passive) magnetic components 23 are connected to the probe element. By us of a greater number of respective components a more precise adjustment of the applied force can be performed and even higher forces can be generated.

Figure 3:
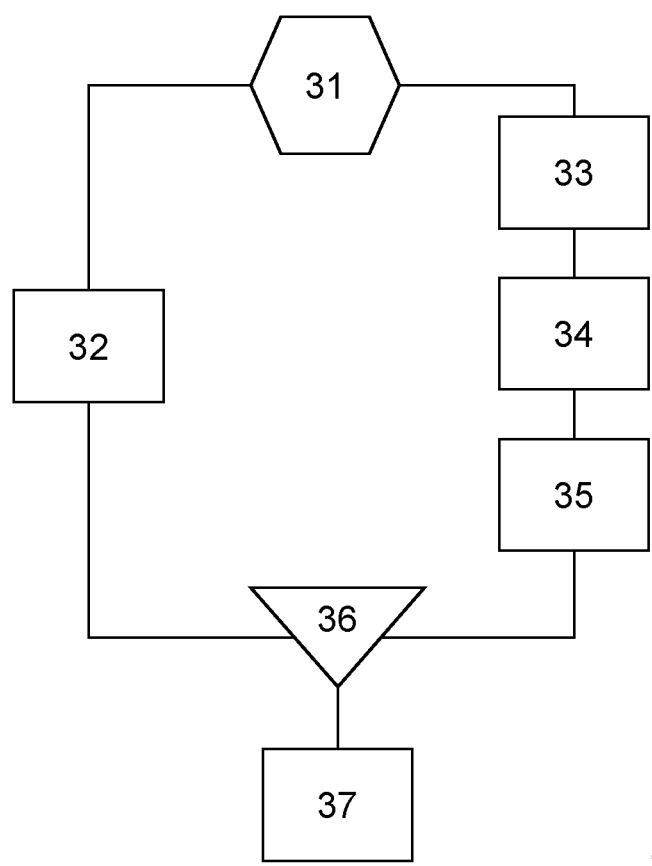
FIG. 3 shows a flowchart depicting a measuring process with a coordinate measuring machine by applying a method according to the invention.

FIG. 3 shows a flowchart depicting a measuring process with a coordinate measuring machine by applying a method according to the invention.

In a first step 31 a part program for measuring an object with the coordinate measuring machine is provided to the measuring system. Such part program may contain dimensional and/or positional information regarding the object, i.e. length, height, width and a shape of the object and/or a desired position or orientation of the object within the measuring volume of the CMM.

Moreover, a measuring path may be defined by the part program. The measuring path provides information about how the probing unit of the CMM is to be moved for measuring the particular object (if the object is already known). Such path typically is adapted with respect to the shape of the object and regarding a demanded precision for measuring the object. In particular, speed parameters for moving and/or rotating (in case of an articulating probe head) the probing unit along the path are given as well.

Thus, the part program enables to measure the object of interest in automatic manner. The probing unit is guided along the measuring path (depicted by step 32), wherein a number of measuring points is either scanned while keeping contact to the object or individually touched with the probe element of the probing unit.

A touching force may be determined for each of those measuring points by use of a respective sensor attached to the probing unit and sensing a movement and/or a force of and/or at the probe element. A desired touching force may be determined, wherein the system can be controlled so that such desired force is not exceeded when touching the object.

When moving the probing unit, inertial forces and/or dynamical effects like vibrations are induced on side of the probe element which may lead to induced forces, displacement errors or vibrational errors negatively influencing resulting measurement values. In order to reduce or totally avoid such influences a method according to the invention is applied.

As depicted with step 33 information about a planned movement of the probing unit is derived on basis of the part program, wherein influences (forces, displacement behaviour) on the probe element emerging by moving the probing unit are derivable from the information about the planned movement. Adaptation of such planned movement might occur while scanning a real surface.

Such influences may be computed based on known parameters of the used probing unit, e.g. length and dimensions of the stylus, mass of the stylus and/or the probe tip, and in particular based on a model which describes a dynamical behaviour of the probing unit and/or the coordinate measuring machine depending on moving the structural components of the CMM. In addition, expected acceleration forces generated at the probe element can be calculated based on the knowledge about the probing unit properties and the expected movement of the probing unit. Moreover, acceleration forces may be measured by attached accelerometers providing information about currently occurring oscillations.

Therefore, step 33 provides information about expected influences and resulting emerging force effects (displacement behaviour, e.g. inertial forces, gravity effects and/or displacements), i.e. influence which occur in case the probing unit is moved as planned, at the probe element depending mainly on the moving parameters. Such information may precisely provide respective influences for particular moving points, i.e. for respective points along the measuring path.

Step 33 also or alternatively may provide information about actual oscillations caused at the probe element. Such vibration effects may be calculated also based on a respective dynamic model and/or observer (Kalman Estimator) and/or may be derived based on direct measurements of actual oscillations (e.g. using an accelerometer at the probing unit).

Knowing about the expected and/or current influences on the probe element when moving the probing unit as planned and thus knowing about e.g. emerging forces at the probe element, a respective actuating signal which provides to suitably control an actuator of the probing unit for actively applying forces to the probe element and/or actively damping vibrations of the probe element can be derived (step 34).

A determined offset signal providing a respective offset counterforce may be provided for counteracting inertial forces and/or a determined oscillation signal providing an active counter-oscillation or a passive damping may be provided for counteracting of occurring vibrations. These signals may be represented by a common controlling signal.

The actuating signal is determined at least for one particular measuring point for which respective movement information is available, i.e. the influences emerging by moving the probing unit are derived for (at least) one particular measuring (moving) point and a actuating signal relating to that particular measuring point is determined. The actuating signal is derived so that when applying the signal to the actuator, a respective counteract is provided by the actuator counteracting an (expected and/or current) moving influence (e.g. inertial force or vibration) at that point.

As mentioned above, the actuating signal provides driving the actuator in defined and variable manner, in particular regarding an offset control for the probe element or damping of the probe element.

Depending on the design and arrangement of the actuator, a counterforce to be applied by the actuator may be induceable with at least one defined actuation direction. It is to be understood in context of the present invention that the actuating signal is set so that at least one particular directional component of the expected displacement behaviour is counteracted, wherein the directional component corresponds to the at least one actuation direction of the actuator.

The determined actuating signal for a particular moving point of the measuring path is supplied to the actuator or to a respective circuit for controlling the actuator (step 35), wherein a control of the actuator is temporarily adapted to the movement of the probing unit. This means that the actuator is controlled depending on a position relative to the particular moving point, i.e. the actuator in particular induces a defined counterforce when reaching or being at the particular moving point (when the position of the probing unit corresponds to the moving point or to a defined tolerance zone around the moving point) which a corresponding displacement is determined for in advance.

By doing so, an individual, variable and well controlled compensation (counteracting) of expected and current induced forces can be performed with relation to any particular moving point, whereby a continuous compensation of inertial forces or vibrations can be provided by reducing or avoiding the occurrence of effects at the probe element which emerge from the influences (displacement behaviour).

As a result of application of the actuating signal to the actuator, a corrective force is induced in the system, in particular at the probe element, which provides to more reliable and precise determination of a position of especially the probe tip at any particular instance of measuring time (36). On the one hand, the position of the probe tip is derived from the relative positions of the structural elements of the CMM (e.g. from respective position encoders) and from a particular alignment (orientation) of the probe head (especially is built as articulating probe head) and, on the other hand, from exactly knowing the induced force at the probing unit and the influences by moving the probing unit.

Putting that information together results in the possibility to determine the position of a measuring point at the object with comparatively higher precision and reliability (represented by step 37), as expected or current inertia forces and vibration effects are considered and actively (adjusted) counteracted.

Although the invention is illustrated above, partly with reference to some specific embodiments, it must be understood that numerous modifications and combinations of different features of the embodiments can be made and that the different features can be combined with damping and feed-forward principles and/or coordinate measuring machines known from prior art.

What is claimed is:

1. A method for compensating a force at a probe element of a probing unit, the probing unit being attached to a coordinate measuring machine and moved along a defined moving path with a number of moving points by the coordinate measuring machine for approaching a measuring point at an object,
   wherein the probing unit comprises an actuator which is arranged and designed in such manner that a counterforce is applicable to the probe element with respect to at least one actuating direction in variable and defined manner, the counterforce depending on an applied actuating signal, wherein the method comprises:
   receiving movement information about an expected and/or measured movement of the probing unit, the movement information provides information about a force affecting the probe element due to movement of the probing unit,
   deriving a force parameter for at least one particular moving point based on the movement information,
   determining the actuating signal for the at least one particular moving point based on the derived force parameter, the actuating signal provides applying a defined counterforce to the probe element by the actuator regarding the force affecting the probe element at the particular moving point.

2. The method according to claim 1, wherein:
   measuring a current at the actuator and, based thereon, deriving a measure for an actual counterforce, wherein the applied current depends on the actuating signal and/or the actuating signal is actualised based on the measured current.

3. The method according to claim 1, wherein:
the movement information provides information about an expected inertial force induced at the probe element by moving the probing unit and/or an expected field force, wherein the expected inertial and/or field force affects a particular displacement force at the probe element relative to the probing unit,
the actuating signal is determined so that the resulting counterforce applicable by the actuator correspondingly counteracts the expected inertial and/or field force, and
the actuating signal is provided to the actuator so that the particular displacement force at the probe element is compensated, wherein the actuating signal is provided as an offset signal.

4. The method according to claim 3, wherein the expected inertial force comprises an acceleration, centrifugal force, or a Coriolis force.

5. The method according to claim 3, wherein the expected field force comprises a gravitational force, an electrostatic force, or a magnetic force.

6. The method according to claim 3, wherein the particular displacement force occurs at a probe tip.

7. The method according to claim 1, wherein:
the movement information provides information about dynamical effects induced at the probe element by moving the probing unit and
the actuating signal is determined and provided to the actuator based on the movement information or the force parameter so that the dynamical effects are damped.

8. The method according to claim 1, wherein:
the force parameter is derived by
computing at least one particular expected displacement of the probe element or the force affecting the probe element for the at least one particular moving point based on the movement information and/or
determining at least one particular expected or measured displacement of the probe element or the force affecting the probe element using a look-up table, the look-up table providing a correlation between an expected and/or measured movement of the probing unit and the induced force.

9. The method according to claim 1, wherein:
providing the actuating signal to the actuator,
in case of the movement information providing information about the expected movement of the probing unit, before the probing unit reaches the particular moving point, and/or
in case of the movement information providing information about the measured movement of the probing unit, on or after the probing unit reaches the particular moving point.

10. The method according to claim 1, wherein:
a first component of the induced force affecting the probe element referring to a first direction is compensated due to application of a defined counterforce in actuating direction by setting the actuating signal, the first direction being at least substantially parallel to the actuating direction.

11. The method according to claim 1, wherein:
deriving acceleration and/or velocity values referring to the moved probe element, and
setting the actuating signal based on the acceleration and/or velocity values.

12. The method according to claim 1, wherein:
continuously actualising the actuating signal depending on the movement information for particular moving points so that respective counterforces as to the induced forces for the particular moving points are applicable to the probe element, and/or
setting the actuating signal based on the movement information such that an expected displacement of the probe element which is induced by moving the probing unit is compensated with reference to a defined set-point, wherein a probe tip remains within a defined tolerance zone around the set-point.

13. The method according to claim 1, wherein:
the movement information is based on
a part program providing a measuring path the probing unit is to be moved along and/or
a given moving trajectory and/or
an encoding unit at the coordinate measuring machine providing moving information of a machine component, and/or
a model representing a structural design and a mechanical behaviour of the coordinate measuring machine and/or the probing unit,
and/or
the movement information provides information for the moving points of the expected movement about
position
movement velocity,
occurring accelerations,
inertial forces and/or
touching forces.

14. A non-transitory computer program product having computer-executable instructions for performing and respectively controlling the method of one of claim 1.

15. A probing system for a coordinate measuring machine, the probing system comprising:
a probing unit with
a probe element; and
an actuator which is arranged and designed in such manner that a force is applicable to the probe element with respect to at least one actuating direction in variable manner, the force depending on an applied actuating signal,
a controlling and processing unit for controlling movement of the probing unit along a defined moving path with a number of moving points, and
providing the actuating signal for controlling the actuator, wherein:
the controlling and processing unit is adapted to receive movement information about an expected and/or measured movement of the probing unit, the movement information provides information about a force affecting the probe element due to movement of the probing unit,
derive a force parameter for at least one particular moving point based on the movement information and
determine the actuating signal for the at least one particular moving point based on the force parameter, the actuating signal provides applying a defined counterforce to the probe element by the actuator at the particular moving point regarding the force affecting the probe element,
wherein the actuating signal is provided to the actuator.

16. The probing system according to claim 15, wherein the actuating signal is provided to the actuator before the probing unit reaches the particular moving point on moving along the moving path.

17. The probing system according to claim 15, wherein the actuating signal is provided to the actuator for counteracting an expected displacement in advance.

18. The probing system according to claim 15, wherein:
the actuator is embodied as an electro-magnetic actuator, a voice-coil, and/or as a pneumatic or hydraulic actuator.

19. The probing system according to claim 15, wherein:
the probing system comprises an impedance element connected to the actuator, the impedance element providing:
adjusting a offset signal applicable by the actuator, and/or
adjusting a damping of dynamic effects occurring at the probe element,
wherein
an offset is settable by adjusting a current of the impedance element and/or
the damping of the dynamic effects is settable by adjusting a resistance of the impedance element,
wherein the controlling signal is represented by the current and/or the resistance.

20. A coordinate measuring machine comprising:
a probing system according to claim 15,
a base,
a machine structure with structural components linking the probing unit to the base and
at least one drive mechanism for providing movability of the probing unit relative to the base.

* * * * *